T. SCHOLTZ.
SPRING WHEEL.
APPLICATION FILED DEC. 3, 1915.

1,175,874.

Patented Mar. 14, 1916.

WITNESSES:
Richard Wegener.
Fred. Roegers.

INVENTOR
Theodore Scholtz
BY
Aladar Hamburger
ATTORNEY

UNITED STATES PATENT OFFICE.

THEODORE SCHOLTZ, OF NEW YORK, N. Y.

SPRING-WHEEL.

1,175,874.  Specification of Letters Patent.  Patented Mar. 14, 1916.

Application filed December 3, 1915. Serial No. 64,830.

*To all whom it may concern:*

Be it known that I, THEODORE SCHOLTZ, a subject of the King of Hungary, residing at New York, in the county and State of New York, have invented new and useful Improvements in Spring-Wheels, of which the following is a specification.

This invention relates to spring wheels and has as its object to provide a device of this character which is an improvement on the invention set forth in the Patent #1158567 granted to me on the 2nd day of November, 1915.

The improvements consist mainly in the particular construction, combination and arrangement of parts hereinafter more specifically described and illustrated in the accompanying drawing, owing to which construction the wheels are made lighter, more simple and substantial and possess other advantages.

Figure 1:
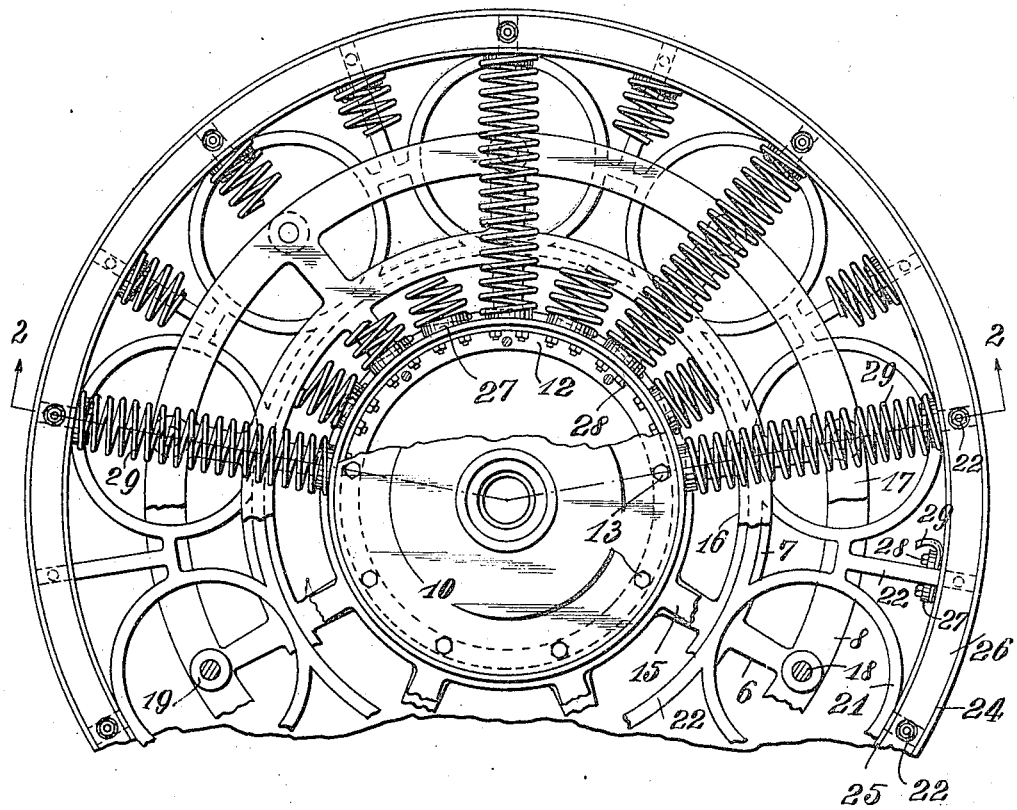
Figure 2:
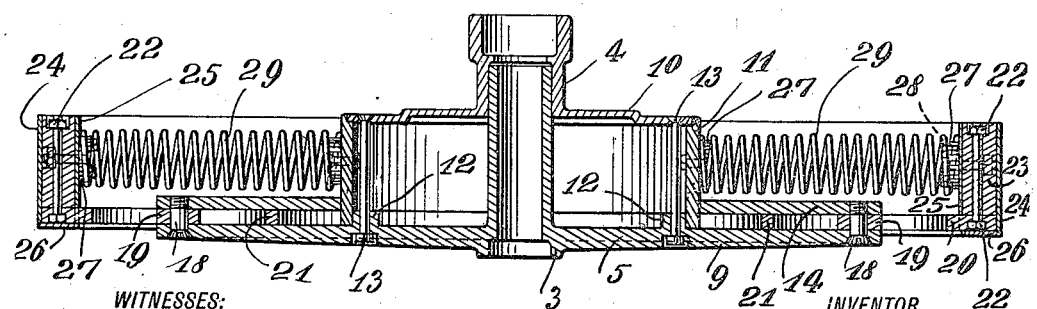

In the drawing, Figure 1 is a fractional front elevational view of my device, some parts being broken away to afford a better view of hidden parts; Fig. 2 is a cross sectional view of the same, taken on the line 2—2 of Fig. 1.

The same part is designated by the same reference character throughout the separate views.

Referring more particularly to the drawing, 3 and 4 are separate parts of the hub of the wheel, the latter tightly fitting over the former. Integrally formed on the rear or inner end (in respect to the vehicle to which the wheel may be attached) of the hub part 3 is a disk 5 having portions near its periphery cut out so as to reduce its weight and forming spoke like members 6 and rings 7 and 8 connecting the same. Radial ribs 9 are formed on the disk 5, coinciding with the spoke like members 6 for the purpose of giving it additional strength.

The hub part 4 has integrally formed thereon a circular cover 10 fitting into a recess formed in the outer edge of a cylindrical member 11, the other edge of which abuts against the disk 5 and is maintained in a concentric position in respect to the latter by an annular flange 12 formed thereon. Countersunk-head screw bolts 13 secure the cover 10 and thereby the member 11 to the disk 5.

A ring 14 fitting exactly around the cylindrical member 11 and having portions cut out similarly to the disk 5, so as to form spoke like members 15 and rings 16 and 17 coinciding with those designated by 6, 7 and 8, respectively,—is secured to the disk 5 by means of countersunk-head screws 18, serving also as shafts for rollers 19 rotatably mounted thereon, between the rings 8 and 17, flush with the outer periphery of the latter.

A skeleton rim-carrying member 20 consisting of annular portions 21 and web portions 22 connecting the same,—is slidably mounted between the disk 5 and the ring 14 so that each roller 19 is confined within one of the annular portions 21 and, in the normal concentric position of all parts just described, each roller is in the center of the respective annular portion.

The rim-carrying member 20 is secured, by means of screw bolts 22, in a manner obvious from the drawing, to a wooden rim 23, covered by a hoop 24 and lined with another hoop 25. A ring 26 is applied to the inner side surface of the rim so as to give it a proper finish.

Between the rim 23 and the cylindrical member 11, secured to both by washers 27 and screw bolts 28, are mounted radially arranged helical coil springs 29, the strength of which is so calculated that normally there is little deviation of the rollers 19 from the center of the annular portions 21, whereas in abnormal cases the rollers 19 striking against the annular portions 21 will prevent the overstraining of the springs 29.

The contact between all the rollers and the respective annular portions of the rim carrying member will in all cases be simultaneous, whether the respective movement be radial, tangential or torsional; an axial respective movement is prevented by the way in which the rim carrying member is mounted.

Having thus described and shown my invention, what I claim is:

A resilient wheel comprising, in combination, a hub portion, a disk formed integrally therewith, a cylindrical member concentrically mounted thereon, another hub portion fitting over the first mentioned hub portion, a cover adapted to close said cylindrical member formed integrally with said latter mentioned hub portion, means for securing said hub portions and said cylindrical member together, a ring mounted on said cylindrical portion and secured to said disk, rollers mounted between said disk and ring flush with the periphery of the latter two, a rim-carrying member slidably mounted between said disk and ring, circular openings in said rim carrying member within each of which one of said rollers is confined, a rim mounted on said rim carrying member and radially arranged springs mounted between said cylindrical member and said rim, substantially as and for the purpose set forth.

In testimony whereof, I have hereunto set my signature in the presence of two witnesses.

THEODORE SCHOLTZ.

Witnesses:
ALADAR HAMBURGER,
F. D. BABCOCK.

Copies of this patent may be obtained for five cents each, by addressing the "Commissioner of Patents, Washington, D. C."